United States Patent Office 2,708,669
Patented May 17, 1955

2,708,669
PROCESS OF MAKING CYANINE DYES AND CERTAIN PRODUCTS

Henri Larivé, Clichy, and Pierre D. Collet, Vincennes, France, assignors to Eastman Kodak Company, Rochester, N. Y., a corporation of New Jersey No Drawing. Application September 26, 1952, Serial No. 311,784

Claims priority, application France June 18, 1952

11 Claims. (Cl. 260—240.7)

This invention relates to a new method for making dyes, many of which are useful as sensitizers for photographic silver halide emulsions, and intermediates therefor.

It is known that certain cyanine (monomethine) dyes can be prepared by condensing α-thioethers of quaternary bases with compounds containing a reactive methyl group. For example, the iodide of 1'-ethyl-3-methylthia-2'-cyanine can be prepared by reacting quinaldine ethiodide with 2-methylmercaptobenzothiazole methiodide, illustrated as follows:

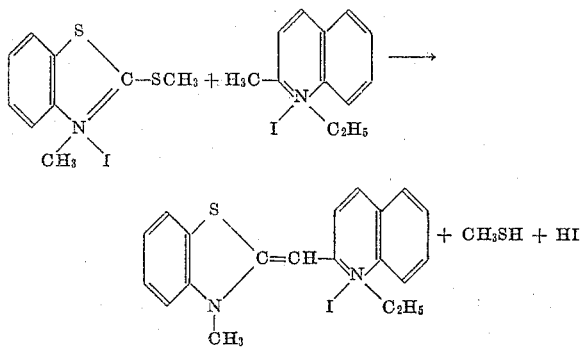

As can be readily seen from the above equation, this method has the grave disadvantage of yielding a gaseous mercaptan ($CH_3SH$), which is highly poisonous. Moreover, any mercaptan remaining as an impurity is quite harmful to photographic emulsions.

Another known method for preparing cyanine (monomethine) dyes comprises reacting a quaternary salt containing a reactive methyl group with a quaternary salt containing an iodo group in the 2-position. This method yields only the dye iodides, which have limited solubility in alcohol, and in order to produce the dye chloride, bromide, etc., which have greater alcohol solubility, it is necessary to resort to further processing.

Instead of employing a cyclammonium quaternary salt containing a reactive methyl group in the condensations with the mercapto or iodo compounds described above, it is possible to employ an intracyclic ketomethylene compound and produce a merocyanine dye.

It is, accordingly, an object of our invention to provide an improved method for making cyanine (monomethine) and merocyanine dyes. Another object is to provide a method for making cyanine (monomethine) and merocyanine dyes without the attendant formation of poisonous mercaptan gases or liquids. Still another object is to provide new intermediates for making cyanine (monomethine) and merocyanine dyes. Another object is to provide a method for making these new intermediates. Other objects will become apparent from a consideration of the following description and examples.

According to our invention we prepare cyanine (monomethine) and merocyanine dyes by condensing a cyclammonium compound selected from those represented by the following general formulas:

I.

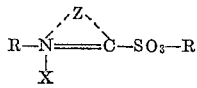

and

II.

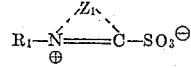

wherein R and $R_1$ each represents an alkyl group, such as methyl, ethyl, n-propyl, n-butyl, etc., X represents an anion, such as methylsulfate, ethylsulfate, benzenesulfonate, p-toluenesulfonate, xylenesulfonate, iodide, bromide, etc., Z represents the non-metallic atoms necessary to complete a heterocyclic nucleus selected from those of the benzothiazole series or the naphthothiazole series, and $Z_1$ represents the non-metallic atoms necessary to complete a heterocyclic nucleus selected from those of the quinoline series or the pyridine series, with a cyclammonium quaternary salt or an intracyclic ketomethylene compound.

Advantageously, the condensations can be carried out in the presence of a basic condensing agent, e. g. triethylamine, tri-n-propylamine, tri-n-butylamine, triisobutylamine, N-methylpiperidine, N-ethylpiperidine, N,N-dimethylaniline, pyridine, etc. Inert solvents, e. g. carboxylic anhydrides (e. g. acetic anhydride, etc.), 1,4-dioxane, piperidine, acetic acid, formamide, nitromethane, nitrobenzene, cresols, etc., can also be employed, if desired. Heat accelerates the condensations, and temperatures varying from room temperature (ca. 20° C.) to the reflux temperature of the reaction mixture can be used.

The cyclammonium quaternary salts which can be used in preparing the cyanine (monomethine) dyes of our invention by condensation with the compounds of Formula I or II above can be advantageously represented by the following general formula:

III.

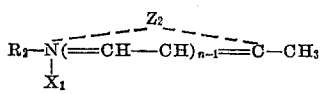

wherein $n$ represents a positive integer of from 1 to 2, $R_2$ represents an alkyl group (i. e. an alcohol radical), e. g. methyl, ethyl, n-propyl, isobutyl, n-butyl, n-amyl, isoamyl (e. g. an alkyl group of the formula $C_mH_{2m+1}$ wherein $m$ represents a positive integer of from 1 to 5), β-hydroxyethyl, γ-hydroxypropyl, β-methoxyethyl, β-ethoxyethyl, allyl, β-methallyl, benzyl (phenylmethyl), β-phenylethyl, β-carboxyethyl, carboxymethyl, α-carboxyethyl, γ-carboxypropyl, β-acetoxyethyl, γ-acetoxypropyl, carbomethoxymethyl, β-carbomethoxyethyl, carbethoxymethyl, β-carbethoxyethyl, β-sulfoethyl, phenylmercaptomethyl, phenoxymethyl, β-phenylmercaptoethyl, β-phenoxyethyl, etc., $X_1$ represents an anion, e. g. chloride, bromide, iodide, thiocyanate, sulfamate, methylsulfate, ethylsulfate, perchlorate, benzenesulfonate, p-toluenesulfonate, xylenesulfonate, etc. and $Z_2$ represents the non-metallic atoms necessary to complete a heterocyclic nucleus selected from the group consisting of those of the thiazole series (e. g. thiazole, 4-methylthiazole, 5-methylthiazole, 4-phenylthiazole, 5-phenylthiazole, 4,5-dimethylthiazole, 4,5-diphenylthiazole, 4-(2-thienyl)thiazole, etc.), those of the benzothiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6- dioxymethylenebenzothiazole, 5-hydroxybenzothiazole, 6-hydroxybenzothiazole, etc.), those of the naphthothiazole series (e. g. α-naphthothiazole, β-naphthothiazole, 5-methoxy-β-naphthothiazole, 5-ethoxy-β-naphthothiazole, 7-methoxy-α-naphthothiazole, 8-methoxy-α-naphthothiazole, etc.), those of the thionaphtheno-7',6',4,5-thiazole series (e. g. 4'-methoxythionaphtheno-7',6',4,5-thiazole, etc.), those of the oxazole series (e. g. 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e. g. benzoxazole, 5-chlorobenzoxazole, 5-phenylbenzoxazole, 5-methylbenzoxazole, 6-methylbenzoxazole, 5,6-dimethylbenzoxazole, 4,6-dimethylbenzoxazole, 5-methoxybenzoxazole, 6-methoxybenzoxazole, 5-ethoxybenzoxazole, 6-chlorobenzoxazole, 5-hydroxybenzoxazole, 6-hydroxybenzoxazole, etc.), those of the naphthoxazole series (e. g. α-naphthoxazole, β-naphthoxazole, etc.), those of the selenazole series (e. g. 4-methylselenazole, 4-phenylselenazole, etc.), those of the benzoselenazole series (e. g. benzoselenazole, 5-chlorobenzoselenazole, 5-methoxybenzoselenazole, 5-hydroxybenzoselenazole, tetrahydrobenzoselenazole, etc.), those of the naphthoselenazole series (e. g. α-naphthoselenazole, β-naphthoselenazole, etc.), those of the thiazoline series (e. g. thiazoline, 4-methylthiazoline, etc.), those of the 2-quinoline series (e. g. quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e. g. quinoline, 6-methoxyquinoline, 7-methylquinoline, 8-methylquinoline, etc.), those of the 1-isoquinoline series (e. g. isoquinoline, 3,4-dihydroisoquinoline, etc.), those of the 3-isoquinoline series (e. g. isoquinoline, etc.), those of the 3,3-dialkylindolenine series (e. g. 3,3-dimethylindolenine, 3,3,5-trimethylindolenine, 3,3,7-trimethylindolenine, etc.), those of the 2-pyridine series (e. g. pyridine, 3-methylpyridine, 4-methylpyridine, 5-methylpyridine, 6-methylpyridine, 3,4-dimethylpyridine, 3,5-dimethylpyridine, 3,6-dimethylpyridine, 4,5-dimethylpyridine, 4,6-dimethylpyridine, 4-chloropyridine, 5-chloropyridine, 6-chloropyridine, 3-hydroxypyridine, 4-hydroxypyridine, 5-hydroxypyridine, 6-hydroxypyridine, 3-phenylpyridine, 4-phenylpyridine, 6-phenylpyridine, etc.), those of the 4-pyridine series (e. g. 2-methylpyridine, 3-methylpyridine, 2-chloropyridine, 3-chloropyridine, 2,3-dimethylpyridine, 2,5-dimethylpyridine, 2,6-dimethylpyridine, 2-hydroxypyridine, 3-hydroxypyridine, etc.), etc. In addition, $R_2$ can represent an aryl group, e. g. phenyl, p-chlorophenyl, etc. when $Z_2$ represents the non-metallic atoms necessary to complete a heterocyclic nucleus of the thiazole, thiazoline, benzothiazole or 3,3-dialkylindolenine series. Those cyclammonium quaternary salts represented by Formula III wherein $R_2$ represents a primary alkyl group containing from 1 to 5 carbon atoms, e. g. methyl, ethyl, n-propyl, isobutyl, n-butyl, n-amyl, isoamyl, β-hydroxyethyl, γ-hydroxypropyl, β-methoxyethyl, β-ethoxyethyl, allyl, β-methallyl, β-carboxyethyl, carboxymethyl, β-carbethoxyethyl, carbethoxymethyl, etc., are especially useful in practicing our invention.

The intracyclic ketomethylene compounds useful in practicing our invention can advantageously be represented by the following general formula:

IV. 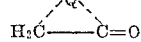

wherein Q represents the non-metallic atoms necessary to complete a heterocyclic nucleus containing from 5 to 6 atoms in the heterocyclic ring, such as, for example, a thiazolone nucleus, for example, a 2,4(3,5)-thiazoledione nucleus, such as 2,4(3,5)-thiazoledione, 3-alkyl-2,4(3,5)-thiazolediones (e. g. 3-ethyl-2,4(3,5)-thiazoledione), 3-phenyl-2,4(3,5)-thiazoledione, 3 - α - naphthyl - 2,4(3,5)-thiazoledione, a 2-thio-2,4(3,5)-thiazoledione (a rhodanine) nucleus, such as a 3-alkyl-2-thio-2,4(3,5)-thiazoledione (3-alkyl-rhodanine) (e. g. 3-ethyl-2-thio-2,4(3,5)-thiazoledione or 3-ethyl-rhodanine, 3-carboxymethyl-2-thio-2,4(3,5)-thiazoledione, 3-carboxyethyl-2-thio-2,4(3,5)-thiazoledione, 3-sulfomethyl-2-thio-2,4(3,5)-thiazoledione, etc.), 3-phenyl-2-thio-2,4(3,5)-thiazoledione (3-phenylrhodanine), 3 - p - carboxyphenyl-2-thio-2,4(3,5)-thiazoledione, 3 - p - sulfophenyl-2-thio-2,4(3,5)-thiazoledione, or 3-α-naphthyl-2-thio-2,4(3,5)-thiazoledione (3-α-naphthylrhodanine nuclei or 3-(1-benzothiazyl)-2-thio-2,4(3,5)-thiazoledione (3 - (1 - benzothiazyl)rhodanine) nuclei, a 2-alkylmercapto-4(5)-thiazolone nucleus, such as 2-ethylmercapto-4(5)-thiazolone, a thiazolidone nucleus, such as 4-thiazolidone or its 3-alkyl (e. g. ethyl), 3-phenyl or 3-α-naphthyl derivatives, a 2-alkylphenylamino-4(5)-thiazolone nucleus or a 2-diphenylamino-4(5)-thiazolone nucleus, an imidazolone nucleus, for example, a 2,4(3,5)-imidazoledione nucleus, such as 2,4(3,5)-imidazoledione (hydantoin) or its 3-alkyl (e. g. ethyl, etc.), 3-phenyl or 3-α-naphthyl derivatives as well as its 1,3-dialkyl (e. g. 1,3-diethyl, etc.), 1-alkyl-3-phenyl (e. g. 1-ethyl-3-phenyl), 1-alkyl-3-α-naphthyl (e. g. 1-ethyl-3-α-naphthyl), 1,3-diphenyl, etc. derivatives, a 2-thio-2,4(3,5)imidazoledione nucleus, such as 2-thio-2,4(3,5)-imidazoledione (2-thiohydantoin) or its 3-alkyl (e. g. methyl, ethyl, etc.), 3-phenyl or 3-naphthyl derivatives as well as its 1,3-dialkyl (e. g. 1,3-diethyl), 1-alkyl-3-phenyl (e. g. 1-ethyl-3-phenyl, 1-carboxymethyl-3-phenyl, 1-sulfomethyl-3-phenyl, etc.), 1-alkyl-3-naphthyl (e. g. 1-ethyl-3-α-naphthyl), 1,3-diphenyl, 1-p-carboxyphenyl-3-phenyl, 1-p-sulfophenyl-3-phenyl, etc. derivatives; a pseudothiohydantoin nucleus (e. g. 2-imino-4-thiazolidone, etc.); tetronic acid; coumarones; homophthalimide; succinimide; an oxazolone nucleus, for example, a 2-thio-2,4(3,5)-oxazoledione nucleus, such as a 3-alkyl-2-thio-2,4(3,5)-oxazoledione nucleus (e. g. 3-ethyl-2-thio-2,4(3,5)-oxazoledione) and a 2-imino-2,4(3,5)-oxazolone (a pseudohydantoin nucleus); a 2-alkylmercapto-5(4)-imidazolone nucleus, such as 2-n-propylmercapto-5-(4)-imidazolone; a thionaphthenone nucleus, such as 2(1)-thionaphthenone or 1(2)-thionaphthenone, a pyrazolone nucleus (e. g. a 3-methyl-1-phenyl-5-pyrazolone nucleus, a 1-p-carboxyphenyl-3-methyl-5-pyrazolone nucleus, a 3-methyl-1-(4-sulfo-1-naphthyl)-5-pyrazolone nucleus, etc.); an oxindole nucleus, such as 2,3-dihydro-3-ketoindole, and like five-membered heterocyclic nuclei; a 2,4,6-triketohexahydropyrimidine nucleus, for example, barbituric acid or 2-thiobarbituric acid as well as their 1-alkyl (e. g. 1-ethyl) or 1,3-dialkyl (e. g. 1,3-diethyl) derivatives; a 3,4-dihydro-2(1)-quinolone nucleus, such as 3,4-dihydro-2(1)-quinolone (dihydrocarbostyril); a 3,4-dihydro-2(1)-quinoxalone nucleus, such as 3,4-dihydro-2(1)-quinoxalone (oxydihydroquinoxaline); 3 - phenomorpholone (1,4,3 - benzoxazine - 3(4) - one or benzo-β-morpholone) nuclei; 1,4,2-benzothiazine-3(4)-one (ketodihydrobenzoparathiazine) nuclei, and the like six-membered heterocyclic nuclei.

In addition to the cyclammonium quaternary salts represented by Formula III above, we have found that a new group of quaternary salts can be employed to give trinuclear cyanine dyes. This new group of quaternary salts can advantageously be represented by the following general formula:

V. 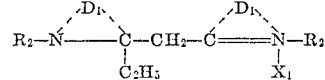

wherein $R_2$ and $X_1$ have the values given above and $D_1$ represents the non-metallic atoms necessary to complete a heterocyclic nucleus selected from those of the benzothiazole series, those of the benzoselenazole series, or those of the naphthothiazole series, for example. Typical compounds embraced by Formula V above include, for example, 2 - (2' - ethyl-3'-methylbenzothiazolyl)methylbenzothiazole methiodide, 2-(2'-ethyl-3'-methylbenzoselenazolyl)methylbenzoselenazole methiodide, 2-(2'- ethyl - 1' - methyl - β - naphthothiazolyl)methyl - β-naphthothiazole methiodide, etc.

The compounds represented by Formula I can be prepared by heating a compound selected from those represented by the following general formula:

Ia.
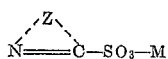

wherein Z has the values given above and M represents an alkali metal atom, together with an alkyl salt of the formula:

A.      R—X wherein R and X have the values given above. The compounds represented by Formula II can be prepared by heating a compound selected from those represented by the following general formula:

IIa.

wherein $Z_1$ and M have the values given above, together with an alkyl salt of the formula:

B.      $R_1$—X wherein $R_1$ and X have the values given above. The salts of Formulas A and B wherein X represents an alkylsulfate or arylsulfonate anion have been found to be particularly useful in practicing our invention. Generally, an excess of the alkyl salts represented by Formulas A and B over the sulfate alkali metal salts represented by Formulas Ia and Ib is employed.

The compounds represented by Formulas Ia and IIa above can advantageously be prepared by oxidizing, respectively, a compound selected from those represented by the following general formulas:

Ib.
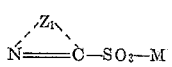

and
IIb.

wherein Z and $Z_1$ each have the values given above, in an aqueous alkaline solution of an oxidizing agent such as hydrogen peroxide or sodium hypochlorite. See, for example, U. S. 2,018,813; U. S. 2,108,712 (Example 4); Br. 418,291; Br. 445,581; Fr. 772,968; Ger. 615,132; Ger. 614,327; and Ital. 328,831. While the above oxidations have been attempted with heterocyclic mercapto compounds other than those represented by Formulas Ib and IIb, attempts to obtain quaternized derivatives thereof were not successful, such as in the case of the benzoxazole and thiazoline derivatives. This may have been due to unusually high solubility which prevented their separation in reasonably pure form, or their instability (as in the case of the thiazoline derivative). The quaternary salts represented by Formulas I and II above are hydrolyzed in the presence of water with varying degrees of ease however, the dye condensations of our invention can actually be carried out in the presence of water alone or alcohols (or other solvents) containing relatively large amounts of water provided a basic condensing agent of convenient pK is selected, such as, triethylamine or pyridine, for example.

The quaternary salts represented by Formula V above can advantageously be prepared by intermixing a methylene base selected from those represented by the following general formula:

VI.
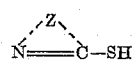

wherein $R_2$ and $D_1$ have the values given above and a salt selected from those represented by the following formula:

C.      $CH_3$—$X_1$ wherein $X_1$ has the values given above.

The following examples will serve to illustrate more fully the manner whereby we practice our invention.

*Example 1.—Methyl ester of the methyl sulfate of benzothiazole-2-sulfonic acid*

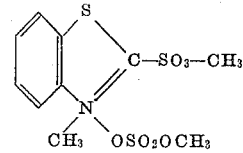

A mixture of 3.78 g. (0.02 mol.+50% excess) of freshly distilled dimethyl sulfate and 2.37 g. (0.01 mol.) of the sodium salt of benzothiazole-2-sulfonic acid prepared, for example, in the known manner, by oxidation of 2-mercaptobenzothiazole in an alkaline medium, was heated at 140° C. for 15–20 minutes. After cooling, the viscous paste obtained was shaken with ether. A white product was obtained which was filtered, thoroughly washed with ether, dried and washed successively with water and with acetone. 1.77 g. (yield 50%) of the desired quaternary salt was obtained. Melting point, 290° C. The quaternary salt was recrystallisable in acetic anhydride, but it partially decomposed.

*Analysis.*—S calculated: 27.06; S found: 26.9.

*Example 2.—Methyl ester of the methyl sulfate of α-naphthothiazole-2-sulfonic acid*

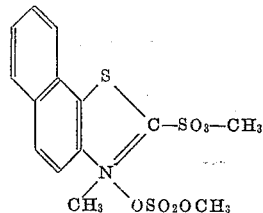

A mixture of 19 g. of dimethyl sulfate (50% excess) and 14.4 g. of sodium α-naphthothiazolesulfonate prepared as described below was heated at 160° C. for five minutes. The crude product of the reaction was ground first with ether, then with a little ice-water, finally with acetone. 11.5 g. of the desired quaternary salt was obtained, melting between 340–345° C.

The sodium α-naphthothiazolesulfonate used in Example 2 was prepared as follows: 71 g. of β-naphthylamine, 76 g. of carbon disulfide and 32 g. of sulfur were heated in a bomb at 210° C. for 6 hours. The product was extracted by two fractions of 1000 cc. of a normal solution of caustic soda, and acidified to Congo red by hydrochloric acid. The precipitated mercaptan was washed with hot benzene and purified by dissolving in caustic soda and reprecipitating with acetic acid. 90 g. of mercaptan was obtained. 2.17 g. (0.10 mol.) of the 2-mercapto-α-naphthothiazole thus prepared were dissolved in 500 cc. of a solution of 0.2N caustic soda. A little animal black was added and the mixture filtered. The solution was cooled in ice and 83 cc. of 3.64 normal sodium hypochlorite solution added slowly while stirring vigorously, and the solution was maintained at 20° C. After completing the introduction of the hypochlorite the solution remained at the room temperature for 30 minutes. 15.5 g. of the sulfonate was collected on a filter. By salting out, a further 5 g. of the sodium salt was obtained.

*Example 3.—N-methylbetaine of quinoline-2-sulfonic acid*

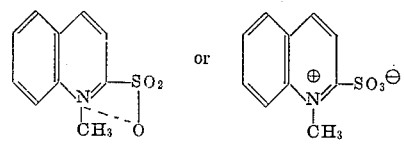

20 cc. of dimethyl sulfate and 12.7 g. of sodium 2-quinoline-sulfonate prepared as described below, were heated at 140–150° C. for 2 hours. After cooling, 5 volumes of ether were added, then dried, and washed with ether. 18.2 g. of the crude product were obtained, mixed with sodium methylsulfate; it was crystallised in alcohol. The desired product decomposed before melting.

*Analysis.*—N calculated: 6.28; found 6.40. H calculated: 4.04; found 4.26.

The sodium 2-quinoline sulfonate used in Example 3 was prepared in a known manner (Ber. 53, 1017, 1920) by oxidation of 2-mercaptoquinoline with concentrated nitric acid. 32 cc. of nitric acid (sp. gr. 1.37) were poured carefully on 4 g. of 2-mercaptoquinoline. Voluminous nitric acid fumes were given off and the product dissolved. A current of carbon dioxide was passed through the solution until it was completely clear. The excess nitric acid was evaporated on a water bath. The residue was treated with a saturated solution of sodium bicarbonate. The insoluble matter was filtered and the sulfonic acid precipitated by dilute hydrochloric acid (1:1). 3.5 g. of the crude acid were obtained and purified by dissolving in a bicarbonate solution and precipitating by hydrochloric acid. The product after purification melted at 370° C. The sodium salt was prepared by heating the acid thus obtained on a water bath with the calculated quantity of an ethyl alcohol solution of sodium ethylate, followed by evaporation to dryness. Yield 96%.

*Example 4.—N-methyl betaine of pyridine-2-sulfonic acid*

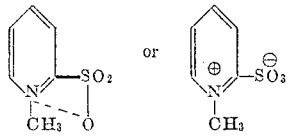

20 cc. of dimethyl sulfate and 7.95 g. of pyridine-2-sulfonic acid prepared as described below were heated at 150–160° C. for five hours, cooled, 5 volumes of ether added, dried, and washed with ether. 9.15 g. of the crude product were obtained, recrystallisable in alcohol and melting at 267–268° C.

*Analysis.*—N calculated: 8.1; found 8.3. H calculated: 4.05; found 4.11. S calculated: 18.45; found 18.45.

Pyridine 2-sulfonic acid was prepared by oxidation of 2-mercaptopyridine by nitric acid. Into 80 cc. of nitric acid (sp. gr. 1.37) to which was added 200 cc. of water, 20 g. of 2-mercaptopyridine were introduced in small portions while stirring. After the product dissolved, it was evaporated to dryness on a water bath, and 20.5 g. of crude acid were obtained. After recrystallisation in methanol, 11 g. of pure acid were collected, melting at 238° C.

*Example 5.—2-(2'-ethyl-3'-methylbenzothiazolyl)methylbenzothiazole methiodide*

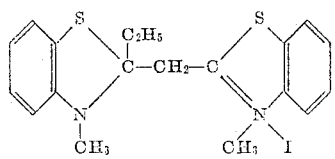

2.84 g. (100% excess) of methyl iodide and 1.63 g. of 3 - methyl - 2 - methylene - 2(3) - dihydrobenzothiazole were introduced into a flask. Heat was evolved and methyl iodide distilled immediately. The product was dried in air. Yield of the crude product was 100%.

After crystallisation in boiling water or in alcohol with decolourising carbon black, a clear yellow product was obtained, melting at 228° C.

*Analysis.*—N calculated: 6.00; found 5.86. S calculated: 13.6; found 13.58. I calculated: 27.1; found 26.53.

The 3-methyl-2-methylene - 2(3)-dihydrobenzothiazole used in Example 5 was prepared as follows. To 100 cc. of a 36° Bé. caustic soda solution cooled in a refrigerating mixture, a cold solution of 27.5 g. of methyl sulfate of 2-methylbenzothiazole was added while stirring vigorously. An oil precipitated and crystallised rapidly. The crystallised precipitate was separated, washed with water, and dried in a vacuum desiccator. It was recrystallisable in ligroine, but it was pure enough to be used directly as the starting material in Example 5. Yield 70%.

*Example 6.—2-(2' - ethyl - 3' - methylbenzoselenazolyl)-methylbenzoselenazole methiodide*

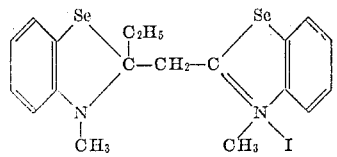

This quaternary salt was prepared in the same manner as that in Example 5 by replacing the methylene base used in that example by a molecularly equivalent amount of 3 - methyl - 2 - methylene-2(3)-dihydrobenzoselenazole. Yield 60%.

*Analysis.*—N calculated 5.0; found 5.1. C calculated 40.5; found 40.35.

*Example 7.—2-(2'-ethyl-1'-methyl-β-naphthothiazolyl)-methyl-β-naphthothiazole methiodide*

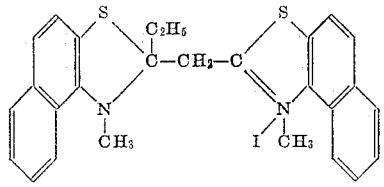

This quaternary salt was prepared in the same manner as that in Example 5 by replacing the methylene base used in that example by a molecularly equivalent amount of 3-methyl - 2 - methylene-β-dihydronaphthothiazole (obtained from 2-methyl-β-naphthothiazole metho-p-toluenesulfonate). It had melting point 262° C. Yield 85%.

*Example 8.—1'-ethyl-3-methylthia-2'-cyanine iodide*

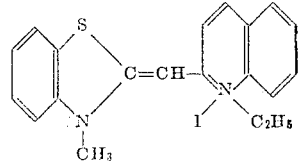

3.55 g. (0.01 mol.) of the methyl ester of the methylsulfate of benzothiazole-2-sulfonic acid and 2.99 g. (0.01 mol.) of ethyl iodide of quinaldine were introduced into a flask containing 75 cc. of ethyl alcohol. 3 g. (0.02 mol. +50% excess) of anhydrous triethylamine were added. The mixture was heated for 20 minutes under reflux. The contents of the flask were cooled in a refrigerating mixture, and the precipitate was filtered and washed with water, then with acetone. After drying, 4.2 g. of the dye was obtained. Yield 94%. After crystallisation in 250 cc. of methyl alcohol, 3 g. of the dye represented by the above formula was obtained.

*Analysis.*—S calculated: 7.37; found 7.34.

The same dye can be prepared using water as reaction medium. For example, a suspension of 7.1 g. of the quaternary salt obtained in Example 1 and 5.9 g. of the ethyl-p-toluenesulfonate of quinaldine were suspended in 100 cc. of ice water. After cooling in ice, 6.25 cc. of triethylamine were added while stirring as vigorously as possible. The dye which separated from the beginning of the addition of the triethylamine was collected on a filter. It was dissolved in 150 cc. of boiling methanol and the solution was poured into 500 cc. of boiling water containing 20 g. of potassium iodide. The dye precipitated immediately. The suspension was cooled, dried and washed with water, and then with cold acetone. 4 g. of dye were obtained. Yield 45%.

*Example 9.—3,3'dimethylthiacyanine iodide*

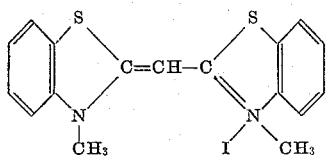

A mixture of 3.55 g. (0.01 mol.) of the quaternary salt obtained according to Example 1, 2.75 g. (0.01 mol.) of the methyl sulfate of 2-methylbenzothiazole and 3 g. (0.02 mol. +50% excess) of triethylamine in 100 cc. of anhydrous ethyl alcohol were heated under reflux. The crude product was poured into a 100 cc. of hot water containing 5 g. of potassium iodide. After cooling, the dye which separated was dried on a filter and then recrystallised in 250 cc. of ethyl alcohol and filtered hot. After thoroughly cooling by a refrigerating mixture, the purified dye was separated and dried. 1.5 g. of the desired dye was obtained.

*Example 10.—3-ethyl-5-(3-methyl-2(3)-benzothiazolylidene)-2-thio-2,4(3,5)-oxazoledione*

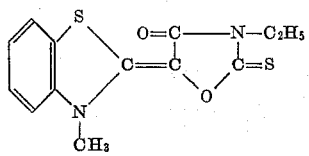

A mixture of 3.55 g. (0.01 mol.) of the quaternary salt obtained according to Example 1 and 1.45 g. (0.01 mol.) of 3-ethyl-2-thio-2,4(3,5)-oxazoledione in 50 cc. of anhydrous ethyl alcohol was heated under reflux for 15 minutes. The product was cooled by a refrigerating mixture and the precipitate collected on a filter. It was washed with water and then by a little acetone. The crude dye weighed 2.9 g. It was recrystallised from a mixture of equal parts of alcohol and pyridine. After drying, 2.5 g. of the desired dye was obtained, melting at 248° C. Yield 86.5%.

*Analysis.*—S calculated: 21.93; found 22.0.

*Example 11.—1-carboxymethyl-5-(3-ethyl-2(3)-benzothiazolylidene)-3-phenyl-2-thiohydantoin*

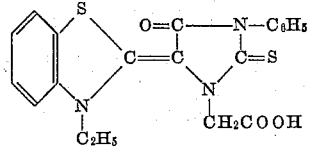

A mixture of 3.1 g. of the quaternary salt obtained in a manner similar to Example 1 (using ethyl sulfate instead of methyl sulfate), 1.9 g. of 1-carboxymethyl-3-phenyl-2-thiohydantoin, and 5.11 cc. of triethylamine in 75 cc. of methyl alcohol was heated under reflux for 30 minutes, filtered hot, and the filtrate acidified with acetic acid. 500 cc. of water were added and the precipitate dried. 2.4 g. of the crude dye were obtained (yield 79%), which was purified by dissolving in alcohol containing double the theoretical quantity of triethylamine and reprecipitating with dilute hydrochloric acid.

*Example 12.—3-carboxymethyl-5-(3-ethyl-2(3) - benzothiazolylidene)rhodanine*

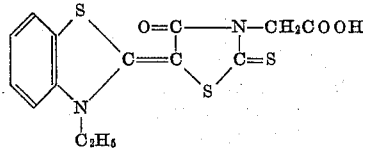

A mixture of 8 g. of the quaternary salt obtained in a manner similar to Example 1 (using ethyl sulfate instead of methyl sulfate), 3.85 g. (0.02 mol.) of 3-carboxymethyl rhodanine and 100 cc. of methyl alcohol to which had been added 9.5 g. of triethylamine was heated for 10 minutes under reflux, filtered hot, and while still hot, acetic acid was added to precipitate the dye. The product was cooled by a refrigerating mixture, the dye separated by filtration, washed with a little methyl alcohol and dried. 6.3 g. of the crude dye (yield 89.5%) thus obtained were purified by dissolving the dye in the form of its triethylamine salt in alcohol and acidification with acetic acid to liberate the acid.

The same dye can be prepared by using water as a reaction medium. At room temperature and stirring vigorously, 80 cc. of triethylamine were added to a suspension of 19.3 g. of 3-carboxymethyl rhodanine and 39.7 g. of the quaternary salt obtained according to Example 1 in 300 cc. of water. After 15 minutes the mixture was warmed to 90° C. and 500 cc. of water added to completely redissolve the triethylamine salt. The solution was filtered, and the filtrate acidified with acetic acid.

*Example 13.—2-diphenylamino-5-(3-methyl-2(3)-benzothiazolylidene)-4(5)-thiazolone*

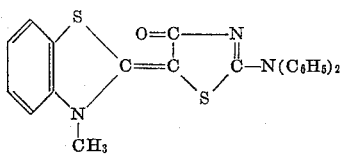

A mixture of 3.5 g. of the quaternary salt obtained according to Example 1 and 2.7 g. of 2-diphenylamino-4(5)-thiazolone, 50 cc. of methanol and 4.1 cc. of triethylamine was heated under reflux for 30 minutes, cooled and the product dried. 2.2 g. of the crude dye thus obtained were purified by dissolving in pyridine and reprecipitating with ethanol. The dye melted at 348° C.

*Example 14.—3-methyl-4-(3-methyl-2(3)-benzothiazolylidene)-1-sulfophenyl-5-pyrozalone*

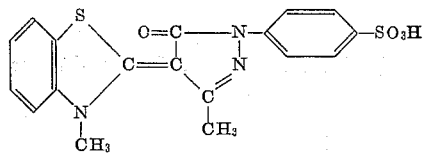

A mixture of 4 g. of the ethylsulfate of ethyl benzthiazolyl sulfate, 2.55 g. of 3-methyl-1-sulfophenyl-5-pyrazolone, 75 cc. of methyl alcohol and 7 cc. of triethylamine was heated under reflux for 30 minutes, filtered hot, ether added to the cooled filtrate, and the product dried. 3.9 g. of the crude dye thus obtained (yield 93%) were purified by dissolving in 40 cc. of hot methyl alcohol.

*Example 15.—3 - ethyl-5-(3-methyl-2(3)-benzothiazolylidene) rhodanine*

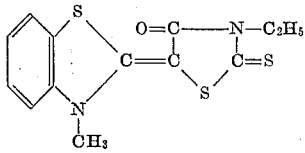

A mixture of 3.55 g. of the quaternary salt obtained according to Example 1, 1.6 g. of 3-ethylrhodanine and 4.1 cc. of triethylamine in 50 cc. of ethanol was heated under reflux, cooled, washed with water, then with acetone. The crude dye was purified by dissolving in the minimum quantity of pyridine and reprecipitating with methanol. 2.9 g. of the desired dye were obtained.

*Analysis.*—N calculated: 9.10; found 9.3.

*Example 16.—1'-ethyl-3-methyl-6,7-benzothia-2'-cyanine iodide*

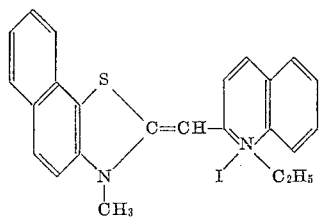

A mixture of 2 g. of the methyl ester of the methyl sulfate of α-naphthothiazole 2-sulfonic acid, 1.5 g. of the ethyl iodide of quinaldine and 3 cc. of triethylamine in 200 cc. of ethyl alcohol was heated under reflux for 15 minutes. After cooling, filtration and drying 2.5 g. of the crude dye were obtained. The dye can be recrystallised in methanol (700 cc. per gram).

Analysis.—N calculated: 5.65; found: 5.80. H calculated: 4.25; found: 4.27.

*Example 17.—1',3 - dimethyl-4',5',6,7 - dibenzothiacyanine p-toluenesulfonate*

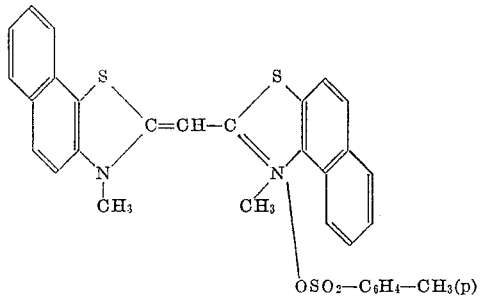

A mixture of 2 g. of the quaternary salt obtained according to Example 2, 1.9 g. of the methyl p-toluenesulfate of 2-methyl-β-naphthothiazole and 3 cc. of triethylamine in 200 cc. of anhydrous ethyl alcohol was heated under reflux for 30 minutes. After cooling the solution, the dye of the above formula separated on a filter.

*Example 18.—3-ethyl-5-(3-methyl-2-α-naphthothiazolylidene)-2-thio-2,4(3,5)-oxazoledione*

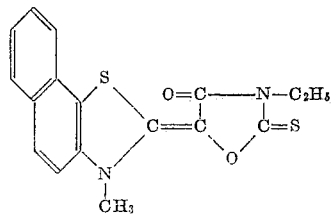

A mixture of 2 g. of the quaternary salt obtained according to Example 2, 0.7 g. of 3-ethyl-2-thio-2,4(3,5)-oxazoledione, and 3 cc. of anhydrous triethylamine and 100 cc. of ethanol was heated under reflux for 5 minutes, cooled and dried. 1.5 g. of the crude dye thus obtained was recrystallised in pyridine and washed with ethanol.

Analysis.—S calculated: 18.7; found: 18.9.

*Example 19.—3-carboxymethyl-5-(3-methyl-2-α-naphthothiazolylidene)rhodanine*

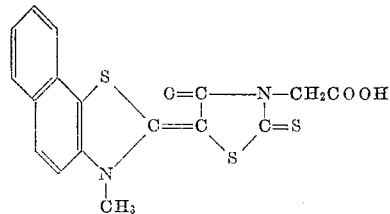

A mixture of 2 g. of the quaternary salt obtained according to Example 2, 0.95 g. of 3-carboxymethyl-rhodanine and 5 cc. triethylamine in 120 cc. of ethanol was heated under reflux for 15 minutes. After cooling, the raw dye was dried and dissolved in alcohol. The alcohol solution was acidified with acetic acid, the dye recrystallised in acetic anhydride.

Analysis.—S calculated: 24.6; found 24.8.

*Example 20.—3-ethyl-5-(1-methyl-2-quinolylidene)-2-thio-2,4-(3,5)-oxazoledione*

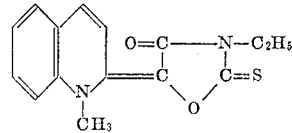

A mixture of 0.36 g. of 3-ethyl-2-thio-2,4(3,5)-oxazoledione, 1.5 g. of N-methyl-betaine of quinoline-2-sulfonic acid and 0.85 cc. of triethylamine in 20 cc. of ethanol was heated under reflux for 20 minutes. 0.9 g. of the crude dye was obtained, and it was recrystallized in methanol.

Analysis.—N calculated: 9.80; found: 9.65. H calculated: 4.90; found: 5.0.

*Example 21.—3-ethyl-5-(1-methyl-2-quinolylidene)-rhodanine*

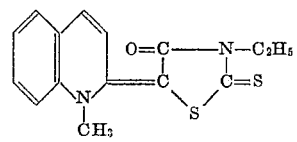

A mixture of 0.4 g. of 3-ethyl rhodanine, 0.87 g. of the N-methyl betaine of quinoline-2-sulfonic acid and 0.85 cc. of triethylamine in 10 cc. of anhydrous ethanol was heated under reflux for 20 minutes. 0.95 g. of the crude dye was obtained and it was recrystallized in 20 cc. of alcohol.

Analysis.—S calculated: 21.19; found: 21.6.

*Example 22.—1'-ethyl-1-methyl-2,2'-cyanine iodide*

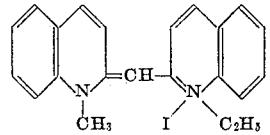

A mixture of 1.49 g. of the ethyl iodide of quinaldine, 3.05 g. of the N-methyl betaine of quinoline-2-sulfonic acid and 1.5 cc. of triethylamine in 40 cc. of ethanol was heated under reflux for 20 minutes. 1.65 g. of crude dye were obtained, which was recrystallized in 90 cc. of methanol.

Analysis.—N calculated: 6.36; found: 6.37. H calculated: 4.80; found: 4.97.

*Example 23.—1'-ethyl-1-methyl-2-pyrido-2'-cyanine iodide*

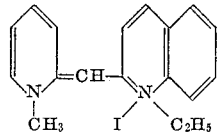

A mixture of 0.9 g. of the ethyl iodide of quinaldine, 0.9 g. of the N-methyl betaine of pyridine-2-sulfonic acid and 0.85 cc. of triethylamine in 25 cc. of anhydrous ethanol was heated under reflux for 10 minutes. 1.3 g. of the dye in a crude state were obtained, which was recrystallised in 40 cc. of methanol.

Analysis.—N calculated: 7.18; found: 7.28. H calculated: 4.87; found: 4.87.

Example 24.—3-ethyl-5-(1-methyl-2-pyridylidene)-2-thio-2,4(3,5)-oxazoledione

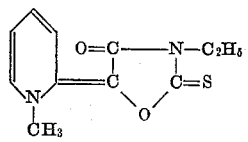

A mixture of 0.35 g. of 3-ethyl-2-thio-2,4(3,5)-oxazoledione, 0.7 g. of the N-methyl betaine of pyridine-2-sulfonic acid and of 0.85 cc. of triethylamine in 15 cc. of ethanol was heated under reflux for 15 minutes. After cooling, 0.56 g. of the crude dye was obtained which was recrystallized in a mixture of 2:1 ethanol to pyridine.

Analysis.—N calculated: 11.85; found: 11.75.

Example 25.—3,3'-dimethyl-8-(2''-ethyl-3''-methyl-2''-benzothiazolinyl)-2,2'-thiacyanine iodide

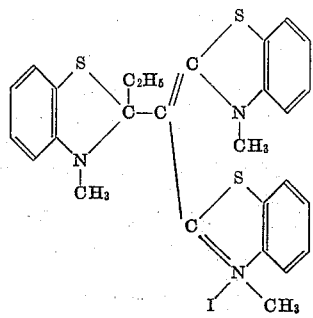

A mixture of 1.2 g. ,0.0025 mol). of the compound obtained according to Example 5, 0.9 g. (0.0025 mol.) of the quaternary salt obtained according to Example 1 and 1 cc. of triethylamine (100% excess) in 20 cc. of anhydrous ethyl alcohol was heated under reflux for 20 minutes, filtered hot, and the filtrate cooled with a refrigerating mixture of ice and alcohol. At the beginning of the precipitation, which was very slow and which was brought about by rubbing the walls of the receiving vessel with a stirrer, a quantity of anhydrous ether was added equal to a third of the volume of the solution. The crude dye after drying and washing weighed 1 g. It was recrystallized in 20 cc. of methyl alcohol. This new compound gives a very intense red fluorescence in the ultra-violet.

Analysis.—N calculated: 6.89; found: 6.80.

Example 26.—3,3'-dimethyl-8-(2''-ethyl-3''-methyl-2''-benzothiazolinyl)-6',7'-benzothiacyanine iodide

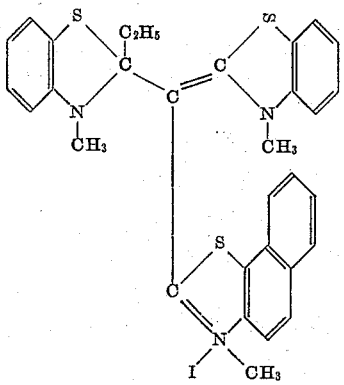

This dye can be prepared according to the process described in Example 25 by replacing the quaternary salt obtained according to Example 1 by a molecularly equivalent amount of the quaternary salt obtained according to Example 2 (methyl ester of the methyl sulfate of α-naphthothiazole-2-sulfonic acid).

Example 27.—3,3'-dimethyl-8-(2''-ethyl-3''-methyl-2''-benzoselenazolinyl)-2,2'-thiaselenacyanine iodide

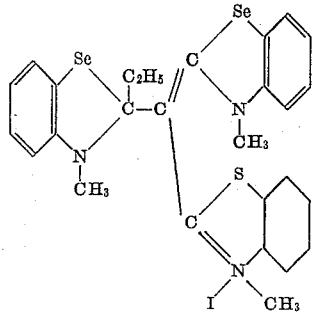

This dye can be prepared according to the process described in Example 25 by replacing the quaternary salt obtained according to Example 5 by a molecularly equivalent amount of the quaternary salt obtained according to Example 6.

Example 28.—3,3'-dimethyl-8'-(2''-ethyl-3''-methyl-2''-β-naphthothiazolinyl)-4,5-benzo-2,2'-thiacyanine iodide

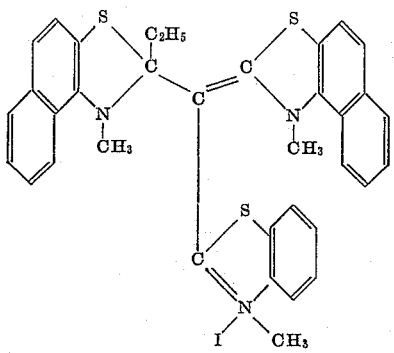

This dye can be prepared according to the process described in Example 25 by replacing the quaternary salt obtained according to Example 5 by a molecularly equivalent amount of the quartenary salt obtained according to Example 7.

The dyes obtainable utilizing the intermediates represented by Formula V above and the new sulfonic esters or betaines of our invention represented by Formulas I and II above can be represented by the following general formula:

D.

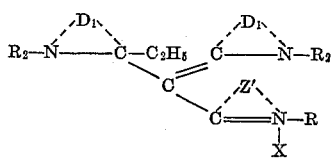

wherein R, $R_2$, $D_1$, and X have the values given above and Z' is the composite symbol of Z and $Z_1$ (i. e. represents the non-metallic atoms necessary to complete a heterocyclic nucleus of the benzothiazole, naphthothiazole, pyridine or quinoline series). The new dyes represented by Formula D above can be used to alter the spectral sensitivity of photographic silver halide emulsions. Many of the dyes can advantageously be used as ultra-violet filters in photographic elements.

The intermediates represented by Formula Ia above can also be prepared by intermixing a 2-halogeno cyclammonium base, e. g. 2-chlorobenzothiazole, with an alkali metal sulfite, e. g. sodium or potassium sulfite, in the form of an aqueous solution thereof.

In oxidizing the intermediates of Formulas Ib and IIb with hydrogen peroxide or sodium hypochlorite in an alkaline medium, we have found that it is advantageous to intermix the mercaptan and oxidizing agent at low temperatures, e. g. 20°–30° C. The yields are thereby increased and formation of the undesired 2-hydroxyl derivatives through decomposition is avoided. The oxidation can be completed by heating at about 80° C. after addition of the oxidizing agent has been completed and exothermic heat of reaction has been removed. The yield can be determined by decomposing the 2-sulfonic acid salt with sulfuric acid in the presence of iodine and back-titrating the excess iodine with sodium thiosulfate.

The intermediates represented by Formula I can be converted to 2-keto derivatives by refluxing in the presence of water for a prolonged period, e. g. 30 minutes. For example, treating the compound of Example 1 in this manner produces 3-methylbenzothiazol-2-one. Heating the intermediates of Formula I together with an alkali metal alcoholate produces the 2-alkoxyl derivatives; for example, heating the compound of Example 1 together with sodium methylate produces 2-methoxybenzothiazole. Heating together the intermediates of Formula I with ammonia (ammonium hydroxide) produces the 2-amino derivatives; for example, heating the compound of example 1 together with ammonium hydroxide in a sealed tube produces 2-amino-3-methylbenzothiazole.

What we claim as our invention and desire secured by Letters Patent of the United States is:

1. A process for preparing cyanine dyes comprising condensing a compound selected from the group consisting of those represented by the following two general formulas:

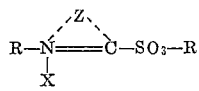

and

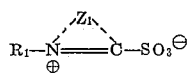

wherein R and $R_1$ each represents an alkyl group, X represents an anion, Z represents the non-metallic atoms necessary to complete a heterocyclic nucleus selected from the group consisting of those of the benzothiazole series and those of the naphthothiazole series, and $Z_1$ represents the non-metallic atoms necessary to complete a heterocyclic nucleus selected from the group consisting of those of the quinoline series and those of the pyridine series, together with a compound selected from the group consisting of those represented by the following three general formulas:

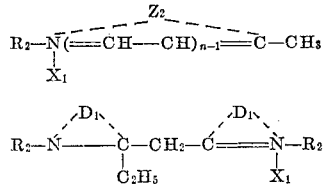

and

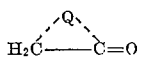

wherein $R_2$ represents an alkyl group, $X_1$ represents an anion, $n$ represents a positive integer of from 1 to 1, $D_1$ represents the non-metallic atoms necessary to complete a heterocyclic nucleus selected from the group consisting of those of the benzothiazole series, those of the benzoselenazole series, and those of the naphthothiazole series, and $Z_2$ and Q each represents the non-metallic atoms necessary to complete a heterocyclic nucleus containing from 5 to 6 atoms in the heterocyclic ring.

2. A process according to claim 1 wherein said condensation is carried out in the presence of a basic condensing agent.

3. A process for preparing 3,3'-dimethyl-2,2'-thiacyanine iodide comprising condensing the methyl ester of the methyl sulfate of benzothiazole-2-sulfonic acid having the following formula:

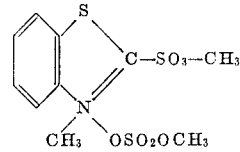

together with the methyl sulfate of 2-methylbenzothiazole in the presence of a basic condensing agent.

4. A process for preparing 1-carboxymethyl-5-(3-ethyl - 2(3) - benzothiazolylidene) - 3 - phenyl-2-thiohydantoin comprising condensing the ethyl ester of the ethyl sulfate of benzothiazole-2-sulfonic acid having the following formula:

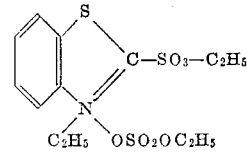

together with 1-carboxymethyl-3-phenyl-2-thiohydantoin in the presence of a basic condensing agent.

5. A process for preparing 3-carboxymethyl-5-(3-ethyl - 2(3) - benzothiazolylidene)rhodanine comprising condensing the ethyl ester of the ethyl sulfate of benzothiazole-2-sulfonic acid having the following formula:

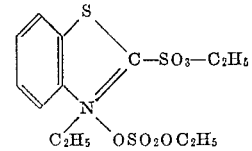

together with 3-carboxymethylrhodanine in the presence of a basic condensing agent.

6. A process for preparing 4-(3-ethyl-2(3)-benzothiazolyl)-3-methyl-1-p-sulfophenyl-5-pyrazolone comprising condensing the ethyl ester of the ethyl sulfate of benzothiazole-2-sulfonic acid having the following formula:

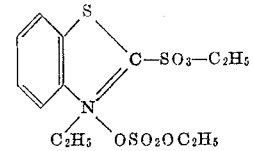

together with 3-methyl-1-p-sulfophenyl-5-pyrazolone in the presence of a basic condensing agent.

7. A process for preparing 3,3'-dimethyl-8-(2''-ethyl-3''-methyl-2''-benzothiazolinyl)-2,2'-thiacyanine iodide comprising condensing the methyl ester of the methyl sulfate of benzothiazole-2-sulfonic acid having the following formula:

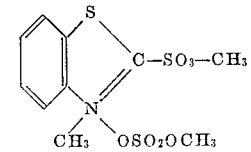

together with 2-(2'-ethyl-3'-methyl-2(3)-benzothiazolyl)-methylbenzothiazole methiodide having the following formula:

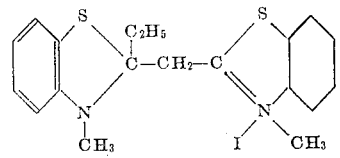

in the presence of a basic condensing agent.

8. A process for preparing monomethine cyanine dyes comprising condensing in the presence of a basic condensing agent a compound selected from those represented by the following general formula:

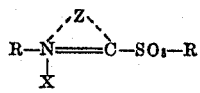

wherein R represents a primary alkyl group, X represents an acid anion, and Z represents the non-metallic atoms necessary to complete a heterocyclic nucleus of the benzothiazole series together with a compound selected from those represented by the following general formula:

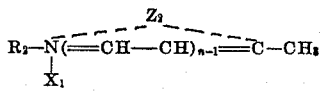

wherein $R_2$ represents a primary alkyl group, $X_1$ represents an acid anion, $n$ represents a positive integer of from 1 to 2, and $Z_2$ represents the non-metallic atoms necessary to complete a heterocyclic nucleus containing from 5 to 6 atoms in the heterocyclic ring.

9. A process for preparing simple merocyanine dyes comprising condensing in the presence of a basic condensing agent a compound selected from those represented by the following general formula:

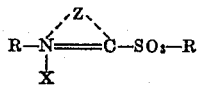

wherein R represents a primary alkyl group, X represents an acid anion, and Z represents the non-metallic atoms necessary to complete a heterocyclic nucleus of the benzothiazole series, together with a compound selected from those represented by the following general formula:

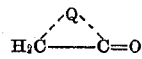

wherein Q represents the non-metallic atoms necessary to complete a heterocyclic nucleus containing from 5 to 6 atoms in the heterocyclic ring.

10. A trinuclear dye selected from those represented by the following general formula:

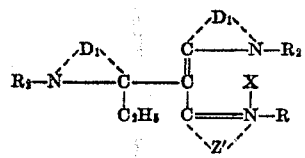

wherein R and $R_2$ each represents an alkyl group, X represents an acid anion, $D_1$ represents the non-metallic atoms necessary to complete a heterocyclic nucleus selected from the group consisting of those of the benzothiazole series, those of the naphthothiazole series, and those of the benzoselenazole series, and $Z'$ represents the non-metallic atoms necessary to complete a heterocyclic nucleus selected from the group consisting of those of the benzothiazole series and those of the naphthothiazole series.

11. The trinuclear dye represented by the following formula:

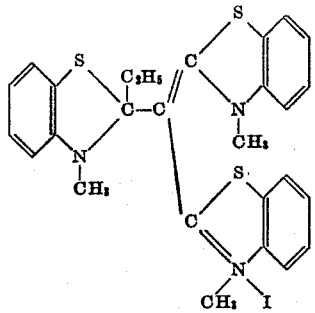

References Cited in the file of this patent

UNITED STATES PATENTS 2,432,060   Anish _____ Dec. 2, 1947

FOREIGN PATENTS 562,754   Great Britain _____ July 14, 1944